(12) United States Patent
Weekamp

(10) Patent No.: US 6,321,429 B1
(45) Date of Patent: Nov. 27, 2001

(54) METHOD OF MANUFACTURING AN ENVELOPED MULTILAYER CAPACITOR

(75) Inventor: Johannus W. Weekamp, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/498,258

(22) Filed: Feb. 3, 2000

Related U.S. Application Data

(62) Division of application No. 09/062,937, filed on Apr. 20, 1998, now Pat. No. 6,094,336.

(30) Foreign Application Priority Data

Apr. 25, 1997 (EP) .................................................. 97201239

(51) Int. Cl.⁷ ...................................................... H01G 4/38

(52) U.S. Cl. .................. 29/25.42; 360/306.1; 360/306.2; 360/306.3

(58) Field of Search ......................... 29/25.42; 361/306.1, 361/306.2, 306.3, 321.2, 303, 305, 308.1, 309

(56) References Cited

U.S. PATENT DOCUMENTS 5,590,016 * 12/1996 Yoshikazu et al. ............... 361/321.2

* cited by examiner

Primary Examiner—Carl E. Hall
(74) Attorney, Agent, or Firm—Norman N. Spain

(57) ABSTRACT

Method of manufacturing an enveloped multilayer capacitor and an enveloped multilayer comprising a method of manufacturing enveloped multilayer capacitors, in which a flat supporting plate of an electrically insulating material is provided with through-holes, dielectric layers and electrode layers are provided in the holes and on both surfaces of the flat supporting plate, after a sufficient number of layers has been provided for the intended purpose, the supporting plate is covered on both sides with a cover plate of an electrically insulating material which is hermetically secured to the supporting plate of an electrically insulating material, the assembly is subdivided into blocks which each comprise a multilayer capacitor enveloped by an electrically insulating material, with partition lines extending through the electrode layers situated on both surfaces of the supporting plate, and, subsequently, end contacts are provided on two opposing ends of the blocks.

3 Claims, 2 Drawing Sheets

METHOD OF MANUFACTURING AN ENVELOPED MULTILAYER CAPACITOR

CROSS REFERENCE TO RELATED APPLICATIONS

Figure 1:
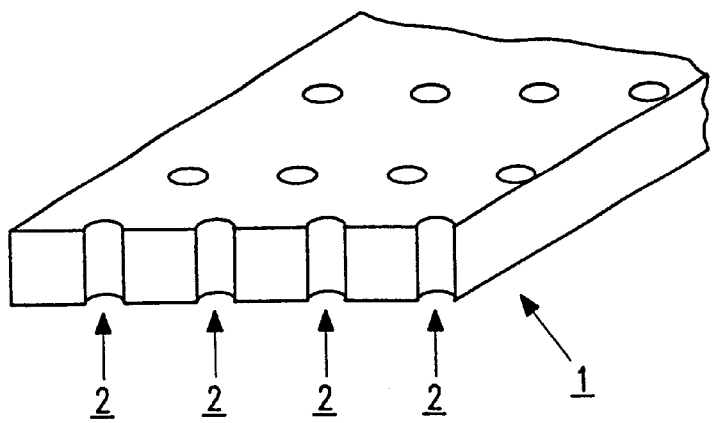

This is a divisional of application, Ser. No. 09/062,937, filed Apr 20, 1998 now U.S. Pat. No. 6,094,336.

The invention relates to a method of manufacturing an enveloped multilayer capacitor, in which method a support of an electrically insulating material is alternately provided with dielectric layers and electrode layers, after which successive electrode layers are alternately connected with a first and a second end contact, and an electrically insulating envelope is provided.

The invention particularly relates to the manufacture of multilayer capacitors of small dimensions which can suitably be mechanically mounted on a substrate provided with a conductor pattern (printed wiring, printed circuit board, PCB), thereby forming an electric or electronic circuit, and the invention also particularly relates to such capacitors (surface-mountable capacitor, SMC). These capacitors do not comprise leads. Instead they are provided with electric end contacts in the form of a solderable metal layer. The end contacts of the capacitors can be used to secure said capacitors in the printed circuit board in a simple manner by means of soldering. By virtue of the small dimensions of such capacitors and the absence of leads, a high packing density of the capacitors and other components of similar dimensions on the printed wiring board can be achieved.

Methods of manufacturing multilayer capacitors, in particular ceramic multilayer capacitors, are generally known. The ongoing miniaturization requires ever smaller dimensions of multilayer capacitors in an electric or electronic circuit. In the case of multilayer capacitors for mounting in a printed circuit board, these dimensions are of the order of 1×0.5×0.5 mm. When such small multilayer capacitors are provided by mechanical means a high dimensional accuracy is very important. The dimensional accuracy of multilayer capacitors manufactured by means of the known method is often insufficient.

It is an object of the invention to provide a method by means of which electrically insulated multilayer capacitors having a high dimensional accuracy can be manufactured.

In accordance with the invention, this object is achieved, in a manner which is satisfactory in view of the current practice, by a method which is characterized in that a. a flat supporting plate of an electrically insulating material is provided with through-holes (channels), b. dielectric layers and electrode layers are provided in the holes (channels) and on both surfaces of the flat supporting plate, said electrode layers being provided from sources situated on either side of the supporting plate, in such a manner that they are alternately provided from one side and from the other side, and the intermediate dielectric layers being provided from sources which are arranged on either side of the supporting plate and which are activated simultaneously, c. after a sufficient number of layers has been provided for the intended purpose, the supporting plate is covered on both sides with a cover plate of an electrically insulating material which is hermetically secured to the supporting plate of an electrically insulating material, d. the assembly is subdivided into blocks which each comprise a multilayer capacitor enveloped by an electrically insulating material, with partition planes extending through the electrode layers situated on both surfaces of the supporting plate, e. and, subsequently, end contacts are provided on two opposing ends of the blocks by providing said ends with solderable metal layers which metal layers sufficiently embrace the ends of the blocks to bring about electric contact with the electrode layers projecting between the portions of the envelope.

An enveloped multilayer capacitor in accordance with the invention is characterized in that said capacitor is built up of alternately provided electrode layers and dielectric layers which are situated on the walls of a through-hole (channel) in a support of an electrically insulating material, which capacitor is encapsulated in a hermetic envelope of glass and/or ceramic material which is composed of several portions, and opposing ends of the envelope are provided with end contacts in the form of solderable metal layers which partly embrace the sides of the envelope and which electrically contact the capacitor encapsulated in the envelope via electrode layers projecting between the portions of the envelope.

Multilayer capacitors thus manufactured exhibit a very high dimensional accuracy which can be achieved even at small dimensions of the order of 1 mm by 0.5 mm by 0.5 mm.

In the method in accordance with the invention, a supporting plate is provided with through-holes in the form of channels which generally extend substantially at right angles to both surfaces of the supporting plate. By means of a suitable process, for example sputtering or physical or chemical vapor deposition, metal films serving as electrode layers and dielectric layers are alternately provided. By arranging the sources of the materials necessary for said process on either side of the supporting plate, the supporting plate can be used as a mask during the application of the layers.

The application of the various layers is essentially carried out as follows. An application source which is arranged on one side of the supporting plate is used to apply an electrode layer to the surface of the supporting plate facing the source and to the wall of the channels in the supporting plate. Subsequently, application sources situated on either side of the supporting plate are used to apply a layer of a dielectric material to both surfaces of the supporting plate and to the wall of the channels. Next, an application source situated on the other side of the supporting plate is used to apply an electrode layer to the surface of the supporting plate facing the application source and to the wall of the channels. Subsequently, in the manner described above, a further layer of a dielectric material is provided, etc. These steps are repeated until the number of applied electrode layers and dielectric layers is sufficient to obtain the intended capacitance of the capacitor. The number of layers is governed by the materials used and the thickness of the layers. The number of layers necessary to attain an intended capacitance can be experimentally established.

The supporting plate may be composed, for example, of a thin plate of an electrically insulating material having a thickness which is preferably in the range between 0.4 and 0.8 mm, for example 0.6 mm. A material which can very suitably be used for this purpose is glass, in particular glass which can be structured photolithographically, such as glass which is marketed by SCHOTT, Mainz, Germany under the trade name FOTURAN. It is alternatively possible to use plates of ceramic materials such as aluminium oxide and zirconium oxide. Through-holes or channels can be formed in the supporting plate by means of known techniques, such as drilling, chemical etching, powder blasting, laser etching and the like.

Properly electroconductive metals, which can be applied from the vapor phase, can be used as the material for the electrode layers. Preferably, metals are used of which an oxide is not electroconductive, such as in particular aluminium ($Al_2O_3$) and tantalum ($Ta_2O_5$). The metals can be provided by sputtering in a vacuum or by physical vapor deposition.

The dielectric material may consist of an electrically non-conductive oxide of the metal used for the electrode layers, if such oxide exists. A very suitable combination consists, for example, of aluminium and aluminium oxide and of tantalum and tantalum oxide. When the oxides of these metals are applied, use can suitably be made of the application sources for these metals while admitting oxygen to the vacuum chamber in which the application process is carried out. The thickness of the individual layers may range, for example, between 0.01 and 1 micron. Other suitable oxidic materials are, for example, silicon dioxide and silicon nitride. If the dielectric material is not the oxide of the metal used for the electrode layers, then it must be applied by means of separate application sources.

To ensure that the vapor-deposited or sputtered layers are of a uniform thickness throughout the plate, the sources and the supporting plate should preferably be moved relative to each other. For this purpose, the application source(s) or the plate having through-holes, or both, can be moved relative to each other during the application process, so that each part of the surface in the holes to be covered is, on average, exposed to the same flow of material per unit area during the application time. Such a movement may consist, for example, of a combination of tilting movements of the plate having through-holes relative to the application sources.

After a sufficient number of layers has been applied for the intended purpose (intended capacitance of the capacitor), for example 50 layers of a dielectric material and the associated electrode layers, a cover plate having a thickness, for example, of approximately 0.2 mm is secured, for example using an adhesive, on either side of the supporting plate. In the case of a 0.6 mm thick supporting plate, the overall thickness of the assembly amounts to approximately 1 mm. The cover plates are preferably made of the same material as the supporting plate. However, it is alternatively possible to use cover plates of another suitable electrically insulating material.

The assembly thus obtained is subsequently subdivided into small blocks each consisting at least of a multilayer capacitor enveloped by an electrically insulating material. The partition planes between the blocks resulting from the division process extend through the metal films forming the electrode layers of the capacitors. The subdivision into blocks may be carried out, for example, mechanically by sawing, breaking or cutting, or by means of a laser and the like. As a result, the side faces of the metal films forming the electrode layers locally project at the side faces of the blocks between the cover-plate portions and the supporting-plate portions of the envelope.

In a subsequent step of the method in accordance with the invention, the block is provided with end contacts which are electrically connected to the side faces of the metal films (electrode layers) and hence to the multilayer capacitor, and, in view of the construction of the envelope, said end contacts embrace the ends of the block. This results not only in a good solderability and good inspectability of the capacitors but also in a good mechanical adhesion of the electric contacts to the envelope of the capacitors.

In a favorable embodiment of the method, the sharp edges of the blocks are mechanically removed prior to the provision of the end contacts. This can be achieved by subjecting the blocks to a tumbling operation in the presence of a suitable grinding agent. In this manner, chipping off of parts of the surface of the envelope during subsequent treatments is precluded.

The electric connections are preferably provided in the following manner. First, the entire surface of the blocks is provided with a metallic nucleation layer. Such a nucleation layer may consist, for example, of a nickel-chromium alloy which is applied by magnetron-sputtering (barrel-sputtering) a bulk sample in a vacuum-chamber. The nucleation layers may alternatively be provided by vapor deposition or by means of a wet-chemical process.

Subsequently, the parts of the blocks which, in a subsequent step, must be provided with a metal layer so as to form an end contact, are covered with a removable masking layer. Next, the metallic nucleation layer is removed from the parts which are not covered with a masking layer, for example by chemical etching, whereafter also the masking layer is removed. For this purpose, the masking layer may consist of a readily soluble or low-melting lacquer or wax. Subsequently, the exposed portions of the nucleation layer are provided with a metal layer and a solder layer which, owing to the construction of the envelope, embrace the ends of the block so as to form an electric connection with the metal films projecting between portions of the envelope.

The method in accordance with the invention yields enveloped multilayer capacitors which can be readily mechanically mounted in an electric or electronic circuit on a supporting plate, said multilayer capacitor being hermetically sealed by means of the envelope. The enveloped multilayer capacitors in accordance with the invention have a very good dimensional tolerance, which can be attributed to the subdivision into blocks in accordance with a pattern, the envelope is impervious as it may consist of glass and/or a ceramic material. If necessary, the enveloped capacitors can be subjected to a tumbling operation. After tumbling, the enveloped capacitors are free of sharp edges which could chip off during further processing, such as sorting, measuring, packing, processing with bulk feeders and the like. As the ends of the enveloped capacitors are completely enveloped by the end contacts, a good solderability and inspectability are obtained.

These and other objects of the invention will be apparent from and elucidated with reference to the embodiments described hereinafter.

Figure 2:
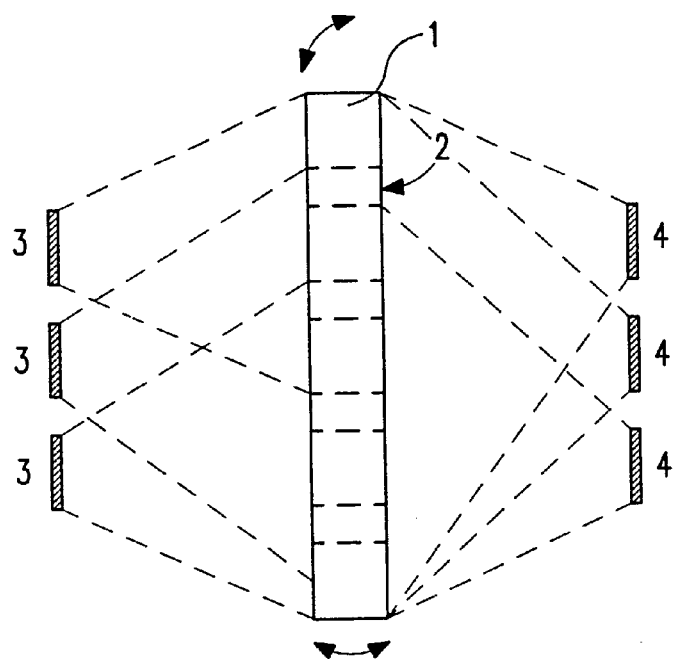
Figure 3:
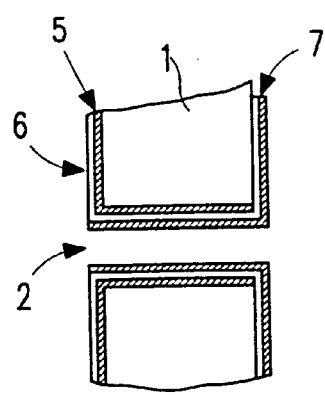
Figure 4:
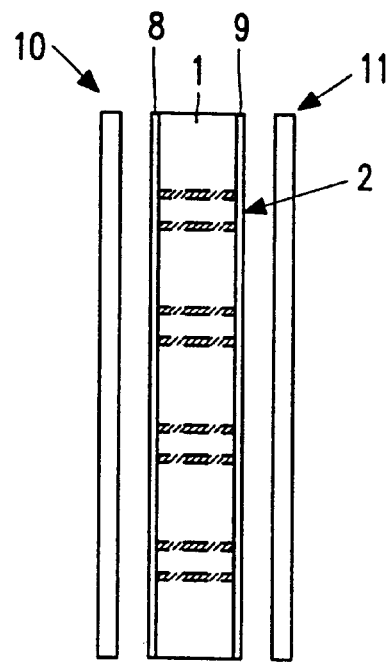
Figure 5:
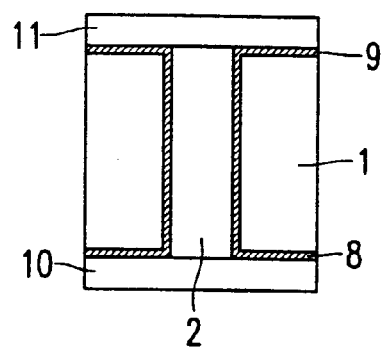
Figure 6:
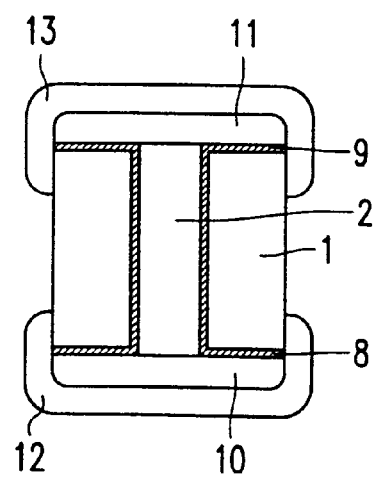

In the drawings:

FIG. 1 is a perspective view, partly in cross-section, of a supporting plate provided with holes, FIG. 2 schematically shows how the electrode layers and dielectric layers can be arranged on the supporting plate, FIG. 3 is a sectional view of a hole in the supporting plate in which several electrode layers and dielectric layers are provided, FIG. 4 schematically shows an assembly of a supporting plate with cover plates, FIG. 5 is a sectional view of a block without electric connections, and FIG. 6 is a sectional view of a finished multilayer capacitor in accordance with the invention.

It is noted that the Figures are not drawn to scale. In the Figures, like reference numerals refer to like parts.

There is started from a supporting plate (1) in the form of a glass plate of FOTURAN. This is a photolithographically structurable, lithium oxide-aluminium oxidesilicon oxide-containing glass comprising small quantities of a photosensitive metal, such as gold, silver and copper as well as cerium oxide. FOTURAN glasses are marketed by SCHOTT, Mainz, Germany. The 0.6 mm thick supporting plate is exposed to UV light via a mask. Subsequently, the supporting plate is subjected to a thermal treatment to bring about a conversion in the glass of the exposed parts. Subsequently, the through-holes (2) having a diameter of 0.3 mm are etched under the influence of a 10% aqueous solution of hydrogen fluoride.

By means of a sputter process using sputter sources (3, 4), the electrode layers (5, 7) and the dielectric layers (6) are alternately provided on the main surfaces and on the surfaces of the through-holes. For this purpose, use can be made, for example, of the following material combinations: aluminium-aluminium oxide, aluminium-silicon oxide, tantalum-tantalum oxide and the like. The layer thickness of the individual layers always is of the order of 0.01 to 1 micron. In this manner, a multilayer of several tens of layers can be provided, with a channel remaining in the center of the multilayer situated in the through-hole of the supporting plate, which through-hole is filled with the adhesive during the provision of the cover plates (10) and (11).

By arranging the sputter sources (3) and (4) on either side of the glass plate, the supporting plate (1) acts as a mask. In this manner, the inner surface of the thoughholes is provided with alternate layers (5) and (7) of a metal with intermediate layers (6) of a dielectric material, for example the oxide of the metal forming the capacitors. The connection contacts between the multilayer and the end contacts (12, 13) are formed by the layer packets (8, 9) which are situated on the main surfaces of the supporting plate (1).

In order to obtain layers of uniform thickness in the through-holes, it is desirable that during the vapor-deposition process the plate should be oscillated about two mutually perpendicular axes, such that each surface part is exposed to the vapor flow for an equal period of time.

After all layers (5, 6, 7) are provided, glass plates (10) and (11) having a thickness of 0.2 mm are provided on both sides of the supporting plate (1) by means of an adhesive, preferably an epoxide resin adhesive. In this process, also the as yet open part of the through-holes (2) is filled with adhesive. The overall thickness of the assembly amounts to approximately 1 mm. The cover plates (10) and (11) do not have to be made of the same glass as the supporting plate (1). Subsequently, a wire-saw is used to subdivide the assembly into individual blocks which each have a through-hole provided with the multilayer.

Prior to the provision of the electric connections, preferably, the sharp edges are mechanically removed from the enveloped capacitors, preferably, by tumbling. In this manner, it is precluded that parts of the edges of the blocks chip off during subsequent operations in which large numbers of blocks are mechanically ordered.

Subsequently, the entire block is covered with a nucleation layer of a nickel-chromium alloy by sputtering in a vacuum (barrel sputtering). The block with the nucleation layer is subsequently provided with a masking layer, for example, of bees wax which is applied to those parts of the block which are to be provided, in a subsequent step, with the electric connections in the form of end contacts (12) and (13), and the exposed part of the nucleation layer is removed by etching with a suitable etching agent. After removal of the masking layer, for example, by means of a warm, aqueous soap solution, both ends of the block are provided with solderable end contacts (12) and (13).

FIG. 5 is a schematic cross-sectional view of a block provided with end contacts (12) and (13), after etching and after the removal of the masking layer. For this purpose, a large number of such blocks are simultaneously provided with a first layer of copper having a thickness of the order of 1 micron by means of electrodeposition, whereafter a layer of nickel having a thickness of the order of 1 micron is electrodeposited thereon, and a layer of a solder metal (PbSn) having a thickness of the order of 10 microns is electrodeposited on said nickel layer. This results in a block as shown in the sectional view of FIG. 6, in which the electric end contacts provided with a solder layer are indicated by the reference numerals (12) and (13). In this manner, an enveloped multilayer capacitor having properly defined dimensions is obtained.

What is claimed is:

1. A method of manufacturing multilayer capacitors, which are provided with an envelope, in which method a support of an electrically insulating material is alternately provided with dielectric layers and electrode layers, whereafter successive electrode layers are alternately connected to a first and a second end contact, and an electrically insulating envelope is provided, characterized in that a. a flat supporting plate of an electrically insulating material is provided with through-holes (channels), b. dielectric layers and electrode layers are provided in the holes (channels) and on both surfaces of the flat supporting plate, said electrode layers being provided from sources situated on either side of the supporting plate, in such a manner that they are alternately provided from one side and from the other side, and the intermediate dielectric layers being provided from sources which are arranged on either side of the supporting plate and which are activated simultaneously, c. after a sufficient number of layers has been provided for the intended purpose, the supporting plate is covered on both sides with a cover plate of an electrically insulating material which is hermetically secured to the supporting plate of an electrically insulating material, d. the assembly is subdivided into blocks which each comprise a multilayer capacitor enveloped by an electrically insulating material, with partition planes extending through the electrode layers situated on both surfaces of the supporting plate, e. and, subsequently, end contacts are provided on two opposing ends of the blocks by providing said ends with solderable metal layers, which metal layers sufficiently embrace the ends of the blocks to bring about electric contact with the electrode layers projecting between the portions of the envelope.

2. A method as claimed in claim 1, characterized in that, after the assembly has been subdivided into blocks f. the sharp edges of the blocks are mechanically removed.

3. A method as claimed in claim 1 or 2, characterized in that g. a metallic nucleation layer is provided on the blocks, h. the parts of the blocks which are to be provided with a metal layer in a subsequent step are covered with a masking layer, j. the metallic nucleation layer is removed from the parts which are not covered with a masking layer, k. the masking layer is removed, l. the exposed nucleation layer is provided with a metal layer and a solder layer which embrace the ends of the block.

* * * * *